United States Patent [19] [11] 4,331,547
Stotts et al. [45] May 25, 1982

[54] COLLAGEN PROTEIN THERMAL INSULATING FOAM AND METHOD

[76] Inventors: Everett J. Stotts, Rte. #1, Rupert, Id. 83350; Glenn S. Arbuthnot, 550 W. Patrice Pl., Unit A, Gardena, Calif. 90248

[21] Appl. No.: 208,945

[22] Filed: Nov. 21, 1980

[51] Int. Cl.³ .......................... C04B 43/00; C08J 9/00; C09H 5/00; C09H 9/00
[52] U.S. Cl. ...................................... 252/62; 106/122; 106/125; 106/126; 106/129; 106/130
[58] Field of Search ............... 106/122, 125, 126, 129, 106/130; 252/62

[56] References Cited

U.S. PATENT DOCUMENTS 3,393,080 7/1968 Erdi et al. .......................... 106/122
3,429,768 2/1969 Young ................... 106/122
3,451,394 6/1969 Bechtol et al. ...................... 106/122

Primary Examiner—Allan Lieberman
Attorney, Agent, or Firm—Keith D. Beecher

[57] ABSTRACT

A thermal insulating foam is provided which is made from a collagen protein such as clear animal glue; and a method of making such a foam is also provided.

9 Claims, No Drawings

COLLAGEN PROTEIN THERMAL INSULATING FOAM AND METHOD

BACKGROUND

Collagen protein, such as animal glue, is an adhesive of great versatility with broad acceptance in industry. This natural polymer is an organic colloid derived from collagen, a protein constituent of the skins, hoofs, bones and connective tissue of animals, principally cattle. Animal glue is actually obtained by boiling the skins, hoofs, bones and the like, of such animals to a jelly.

Collagen protein, such as animal glue, has been used as an adhesive since earliest times. The stability and durability of this product is attested by the fact that antique furniture made two or three hundred years ago using animal glue as the adhesive can still be found today with firm and strong glue bonds. Therefore, in use since earliest times and in good supply, the modern animal glue collagen protein is usually produced from the hides or bones of either cattle or pigs. In 1681 bone glues were being produced by steam heating a pressure vessel. Today's procedures are well ordered and primarily consist of a succession of extraction processes. The following is a stylized flow sheet.

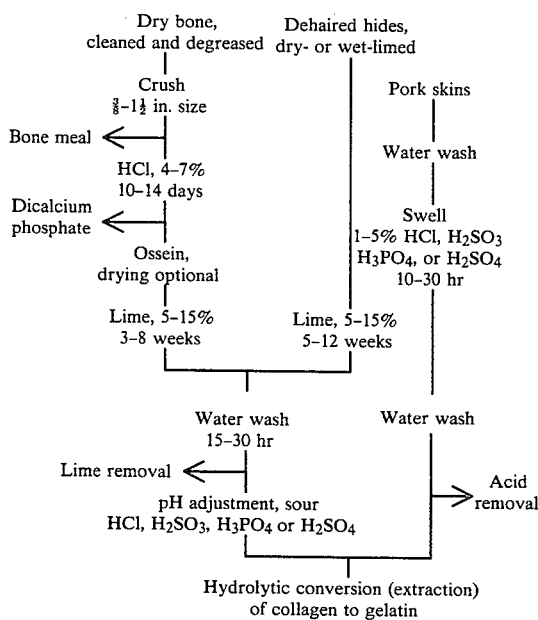

| Extraction | Time, hr | Temp, °C. | Gelatin, % |
|---|---|---|---|
| 1 | 4–9 | 55–65 | 5–10 |
| 2 | 4–8 | 65–75 | 3–6 |
| 3 | 4–6 | 75–85 | 3–6 |
| 4 | 4–6 | 85–95 | 2–4 |
| 5 | 2–4 | 95–100 | 1–2 |

Tankage and grease (See Vol. 3, p. 569)

-continued

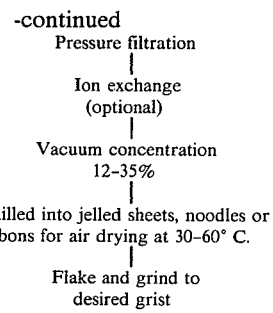

As the technology of manufacturing animal glues is old, and each industry has developed its own methods and procedures, large technological advances are somewhat rare. The chemistry is dependent on the excess pendant groups and the polarity of the macromolecule. The pendant groups consist of amines, acids, and alcohols, and undergo the typical reactions of those compounds. The polarity of the macromolecule makes this product extremely resistant to all solvents except water. Proper crosslinkage (tannage) after placement improves the water resistance immeasurably.

Although the product is a true protein and completely non-toxic, it is an exceptionally poor source of foods.

The amino acid analysis of various animal glues has been well established. The analysis is very similar regardless of the starting source, varying only by a percent or so.

|  | Type A (Porkskin) | Type B (Skin) | Type B (Bone) |
|---|---|---|---|
| Alanine | 8.6–10.7 | 9.3–11.0 | 11.3 |
| Arginine | 8.3–9.1 | 8.55–8.8 | 9.0 |
| Aspartic Acid | 6.2–6.7 | 6.6–6.9 | 6.7 |
| Cystine | 0.1 | Trace | Trace |
| Glutamic Acid | 11.3–11.7 | 11.1–11.4 | 11.6 |
| Glycine | 26.4–30.5 | 26.9–27.5 | 27.2 |
| Histidine | 0.85–1.0 | 0.74–0.78 | 0.7 |
| Hydroxylysine | 1.04 | 0.91–1.2 | 0.76 |
| Hydroxyproline | 13.5 | 14.0–14.5 | 13.3 |
| Isoleucine | 1.36 | 1.7–1.8 | 1.54 |
| Leucine | 3.1–3.34 | 3.1–3.4 | 3.45 |
| Lysine | 4.1–5.2 | 4.5–4.6 | 4.36 |
| Methionine | 0.8–0.92 | 0.8–0.9 | 0.63 |
| Phenylalanine | 2.1–2.56 | 2.2–2.5 | 2.49 |
| Proline | 16.2–18.0 | 14.8–16.35 | 15.5 |
| Serine | 2.9–4.13 | 3.2–4.2 | 3.73 |
| Threonine | 2.2 | 2.2 | 2.36 |
| Tyrosine | 0.44–0.91 | 0.2–1.0 | 0.23 |
| Valine | 2.5–2.8 | 2.6–3.4 | 2.77 |

The major variation in various types of animal glue is in the molecular weight of the various extractions. This molecular weight difference accounts for the wide variation in socalled bloom strength and viscosity of the solution. The following table gives the bloom strengths of the various grades of animal hide glue.

| Peter Cooper Standard Grade | National Association of Glue Manufacturers Grade | Bloom Grams Range | Mid-Point | Millipoise Value (Minimum) |
|---|---|---|---|---|
| 5A Extra | 18 | 495–529 | 512 | 191 |
| 4A Extra | 17 | 461–494 | 477 | 175 |
| 3A Extra | 16 | 428–460 | 444 | 157 |
| 2A Extra | 15 | 395–427 | 411 | 145 |
| A Extra | 14 | 363–394 | 379 | 131 |

-continued

| Peter Cooper Standard Grade | National Association of Glue Manufacturers Grade | Bloom Grams Range | Mid-Point | Millipoise Value (Minimum) |
|---|---|---|---|---|
| #1 Extra | 13 | 331–362 | 347 | 121 |
| #1 Extra Special | 12 | 299–330 | 315 | 111 |
| #1 | 11 | 267–298 | 283 | 101 |
| 1XM | 10 | 237–266 | 251 | 92 |
| 1X | 9 | 207–236 | 222 | 82 |
| 1¼ | 8 | 178–206 | 192 | 72 |
| 1⅜ | 7 | 150–177 | 164 | 62 |
| 1½ | 6 | 122–149 | 135 | 57 |
| 1⅝ | 5 | 95–121 | 108 | 52 |
|  | 4 | 70–94 | 82 | 42 |
|  | 3 | 47–69 | 58 |  |
|  | 2 | 27–46 | 36 |  |
|  | 1 | 10–26 | 18 |  |

The prior art thermal insulating materials for the most part have one or more major drawbacks. For example, polystyrene and polyurethane foams are usually highly flammable; whereas the flame retardant types have a tendency to produce significant quantities of toxic smoke when a fire occurs. The prior art cellulose insulation materials include either inorganic flame retardants which leach out over periods of time, or organic flame retardants which produce large quantities of toxic smoke. The prior art thermal insulating materials such as fiberglass and mineral wool are suspected carcinogens and, in addition, are often backed by paper which is readily combustible.

The animal glue collagen protein thermal insulating foam of the present invention, on the other hand, is naturally fire retardant, it is smokeless, and it has products of combustion which have an extremely low toxicity. The insulating foam of the invention has a relatively high thermal insulation factor of the order of R 3.91/inch. The foam, moreover, is not attractive as food to rats, mice, cockroaches, or the like. The dry density of the foam is of the order of 0.5 pcf.

The animal glue collagen protein foam of the invention may be produced by appropriate foaming apparatus, such as described in Copending Application Serial No. (K-2418). The foam may be marketed in dry sheets designed, for example, to press-fit into stud cavities with no additional support of any kind being required. Alternatively, the foam may be marketed as a dry granule composition, to be applied wet by appropriate foaming apparatus at the site.

The difficulty in producing animal glue collagen protein foam lies in assuring that the foam will dry without collapsing at the ambient temperature at which it is to be used. This difficulty is overcome, in accordance with the method of the present invention, by establishing the gel formation temperature of the foam at at least 10° F. above the highest expected ambient temperature. For example, if the ambient temperature is to be at or below 75° F., the gel temperature should be in a range of 85°–95° F.

An appropriate collagen protein for the formation of the foam of the invention, as described above, is clear animal glue. Clear animal glues of any bloom strength from any source may be utilized, as long as they are properly compounded. However, gel temperatures are dependent to some extent on the bloom strength of the glue, and if the resulting gel temperature for a particular bloom strength is below the temperature required to withstand maximum ambient temperature, another collagen protein ingredient such as gelatin must be added to bring the gel temperature to the desired level. The critical consideration is matching the gel temperature of the solution to the expected maximum ambient temperature to be encountered.

In the following example (Example 1), gelatin is added to clear animal glue to bring the gel temperature of the resulting solution up to a range of 85°–90° F. In the example, clear animal glue, obtained for example from the Peter Cooper Corporation of Gowanda, N.Y. and designated by them as their clear glue (No. 1 Extra Special), is used in conjunction with gelatin which may be obtained from the U.S. Gelatin Corporation of Gowanda, N.Y., and which bears the generic designation 6A.D. Such clear glue has a glue bloom strength of about 310, and such gelatin has a gelatin bloom strength of about 150–160. The gel temperature of the resulting solution is of the order of 85° F.–90° F., so that the resulting foam is suitable for use in ambient temperature conditions of the order of 75° F., or lower.

A foaming agent and foam stabilizer is added to the solution which may, for example, by sodium dodecylbenzene sulfonate which may be obtained from the Pilot Chemical Company, 11756 East Burke, Santa Fe Springs, Calif. Also, a fungucide and bactericide is added to the solution to prevent mildew, and the like. An appropriate fungicide and bactericide may be obtained from Imperial Chemical Incorporated of Wilmington, Del., the product being designated by them under the trademark "Proxcel C.R.L.".

EXAMPLE 1

| Water | 50 lbs. |
|---|---|
| Dry Clear Animal Glue | 8 lbs. |
| Dry gelatin | 2 lbs. |
| Foaming Agent and Stabilizer | 160 grams |
| Fungicide and bactericide | 35 grams |

In carrying out the process of Example 1, the water is first heated to 160° F., and the heat source is removed. The dry glue and dry gelatin are weighed and mixed together. The dry mixture is then slowly stirred into the hot water, and the stirring is continued until a solution is obtained. The temperature at this point is about 135° F. The required amount of the foaming agent and foam stabilizer such as L-60 is then added, and then the fungicide and bactericide such as Proxcel C.R.L. is added, and these ingredients are slowly stirred into the solution until solution is complete. It should be noted that fast stirring will produce undesirable foaming. The solution is then allowed to cool to approximately 115° F., and it is foamed through appropriate foaming apparatus, such as the apparatus described in the copending application. The resulting foam is allowed to dry at temperatures of 75° F. or lower. The result is an excellent thermal insulation foam of the following characteristics:

Gel temperature of solution: 85°–95° F.
Viscosity of solution ad 115° F.: 110–120 cps
Brookfield (RVF) #2 spindle at 20 R.P.M.

The following is a summary of the properties of the foam:

| Chemical Chain | Collagen Protein |
|---|---|
| Density (dry) | ¼ to ½ lbs/ |

-continued

| | cu. ft. |
|---|---|
| Durability | Excellent |
| Flame Spread | 30 |
| Aged 28 days | 20 |
| Fuel Contribution | 0 |
| Aged 28 days | 0 |
| Smoke Density | 5 |
| Aged 28 days | 0 |
| Thermal Conductivity (K) | 0.256 |
| Thermal Resistance (R) | 3.91/inch |
| Flash Point | 775 F. |
| Self Ignition Temp. | 1020 F. |
| Toxic Products of Combustion | Polyganic CO-.026 Mole % Douglas Fir CO-5.408 Mole % |
| Fungi | No Growth |
| Corrosion | None |
| Moisture Absorption | 5.5% |
| Smoldering Combustion | +0.1% |
| Water Drip Test | Satisfactory |
| Cockroach Nutrition | Non-nutritive |

If the expected ambient temperatures are higher than 75°, the gel temperature of the solution must be increased proportionately in order that the foam will stand up at the higher ambient temperatures. For example, if the foam is to be used in an attic with an expected ambient temperature of 120° F., the gel point of the solution must be increased to 130°-140° F. Such higher gel points cannot be accomplished by utilizing collagen protein mixtures alone, such as in Example 1. However, such high gel points can be achieved by utilizing other materials of high temperature gelling characteristics in the solution. Such a material, for example, is iota carrageenan.

EXAMPLE 2

| Water | 50 lbs. |
|---|---|
| Dry clear animal gue | 10 lbs. |
| Iota Carrageenan (Medium Viscosity) | 70 grams |
| Foaming and Stabilizing Agent | 160 grams |
| Fungicide and Bactericide | 35 grams |

Carrying out Example 2, the water is weighed out, and the carrageenan is stirred into the water while it is cold, and the stirring is continued throughout the heating cycle. The water and carrageenan mixture is then heated until the carrageenan is completely dissolved which occurs, for example, in the region of 170° F. The source of heat is then removed, and the solution is allowed to cool to 160° F. The clear animal glue is then stirred into the solution until the glue is completely dissolved. Similarly, the foaming agent and stabilizer, and the fungicide and bactericide are stirred into the solution until dissolved. The solution is maintained at a temperature between 140°-145° F. The solution is foamed immediately through appropiate foaming apparatus, such as described in the copending application. The resulting foam is allowed to dry at temperatures of 120° F. or lower.

The characteristics of the dried foam made in accordance with Example 2 are essentially the same as those of Example 1, with the following exceptions:

Gel Temperature of solution: 130°-135° F.
Viscosity of solution at 145° F: 220-280 cps The examples set forth above are not meant to limit the scope of the invention in any way. Obviously, other collagen proteins may be used. Clear glues of any bloom strength from any source may be utilized, as mentioned above, as long as they are properly compounded. Likewise, gelatins from any appropriate source can be used. The critical point in the process if matching the gel temperature of the solution to the maximum ambient temperature to which the resulting foam is to be exposed.

Other foam stabilizers may also be used. Nonionics, cationics, anionics, and amphoterics of a broad range have been used successfully. Fatty acid soaps have also successfully been used as a foam stabilizer.

Likewise, gelling agents other than iota carrageenans may be used with iota carrageenans of higher viscosity being used to produce even higher gel temperatures. Kappa carrogeenans may be used, as well as mixtures of Kappa carrageenans and locust bean gums. Other gelling agents to achieve higher gel temperatures, for example polysaccharides such as gum agar, locust bean gum, pectins, and gum furcellaran, may be used under appropriate conditions. Also, starches and starch derivatives may be used as gelling agents under some conditions.

For foam protection against attack from mildew, fungus and bacteria, agents other than the Proxcel C.R.L. suggested above may be used, including a broad variety of heavy metal agents currently on the market.

Accordingly, although particular embodiments of the composition and process have been described, modifications may be made, and it is intended in the following claims to cover all modifications which come within the true spirit and scope of the invention.

What is claimed is:

1. A process for producing a collagen protein thermal insulating foam which comprises: dissolving in water in a proportion of 10:5 by weight a quantity of material including animal glue having a bloom strength of the order of 310 and having a gel temperature at least 10° F. above the ambient temperature at which the insulating foam is to be used, foaming the resulting solution, and permitting the foam to dry at a temperature corresponding to said ambient temperature.

2. The process defined in claim 1, in which said material comprises a mixture of said animal glue and gelatin having a bloom strength of the order of 150-160 in a proportion of 4:1 by weight.

3. The process defined in claim 1, and which includes adding a foaming agent and a foam stabilizer to the solution.

4. The process defined in claim 1, and which includes adding a fungicide and a bactericide to the solution.

5. The process defined in claim 1, in which the material comprises a mixture of carrageenan and said animal glue in a proportion of substantially 10 pounds to 70 grams.

6. A thermal insulating foam consisting of a material including animal glue having a bloom strength of the order of 310, and said material having a gel temperature at least 10° F. higher than the ambient temperature at which the foam is to be used.

7. The thermal insulating foam defined in claim 6, in which said material comprises a mixture of said animal glue and gelatin having a bloom strength of the order of 150-160 in a proportion of 4:1 by weight.

8. The thermal insulating foam defined in claim 6, in which said material comprises a mixture of said animal glue and carrageenan in a proportion of substantially 10 pounds to 70 grams.

9. The thermal insulating foam defined in claim 6, and which includes a fungicide and a bactericide.

* * * * *